United States Patent [19]

DeYoung

[11] Patent Number: 4,594,720
[45] Date of Patent: Jun. 10, 1986

[54] LONG GAIN LENGTH SOLAR PUMPED BOX LASER

[75] Inventor: Russell J. DeYoung, Newport News, Va.

[73] Assignee: The United States of America as represented by the Administrator of the National Aeronautics and Space Administration, Washington, D.C.

[21] Appl. No.: 745,973

[22] Filed: Jun. 18, 1985

[51] Int. Cl.⁴ .............................................. H01S 3/091
[52] U.S. Cl. ...................................................... 372/79
[58] Field of Search ......................... 372/70, 79, 71, 94

[56] References Cited

U.S. PATENT DOCUMENTS 3,215,949 11/1965 Garrett .
3,361,987 1/1968 De Maria .
3,732,505 5/1973 Freedman .............................. 372/71
3,904,983 9/1975 Moreno et al. .
4,300,106 11/1981 Hohl et al. .
4,420,836 12/1983 Harper .................................. 372/94

Primary Examiner—William L. Sikes
Assistant Examiner—Robert E. Wise
Attorney, Agent, or Firm—Howard J. Osborn; John R. Manning

[57] ABSTRACT

A solar pumped laser has its lasing path lengthened by forming a square loop in the lasing path by means of bending mirrors. Solar radiation is collected and concentrated into a donut shaped intensity pattern. This intensity pattern is directed onto the lasing path such that there is a maximum fit of the solar intensity pattern to the square loop laser cavity.

16 Claims, 1 Drawing Figure

U.S. Patent   Jun. 10, 1986   4,594,720
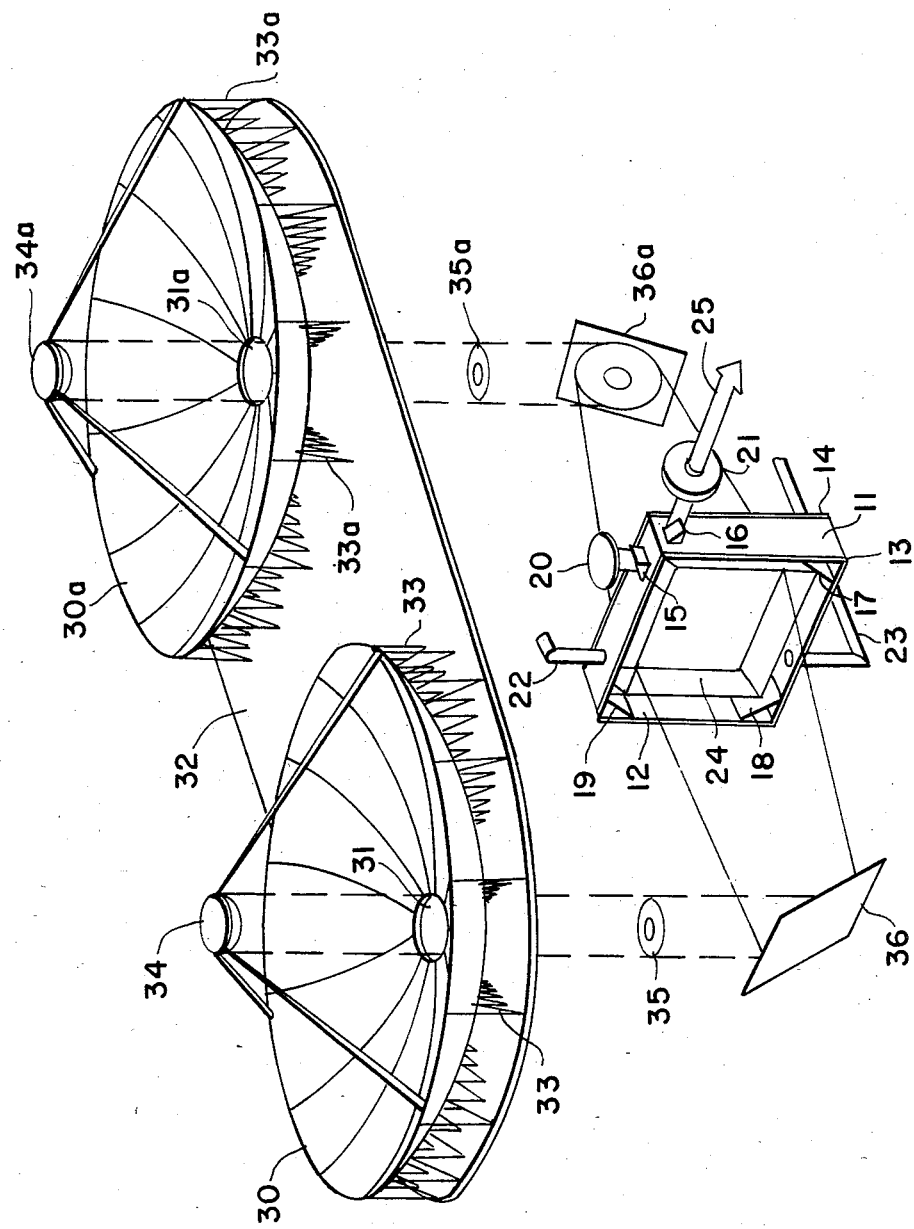

LONG GAIN LENGTH SOLAR PUMPED BOX LASER

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The invention relates generally to lasers and more particularly to solar pumped gas lasers.

The conversion of solar radiation into laser light has application in space power transmission where long transmission distances are encountered. To make this conversion, solar radiation is collected in space by a large reflector and then focused on a laser cavity containing an appropriate lasant such as $C_3F_7I$. The resulting laser energy is then beamed to user for onboard electrical and propulsion needs. Gas lasers are particularly suitable for high power operation since the gaseous lasant is nondestructible and waste heat removal is straightforward.

Previous solar pumped gas laser systems have been limited to laser gain lengths of less than 10 centimeters, which requires very high solar concentrations to achieved lasing. Further, when such high solar concentrations are required, lasing is susceptible to spatial variations in the input solar radiation pattern thereby causing instabilities in the laser beam profile.

An object of this invention is to provide a long gain length solar pumped laser suitable for use in space power transmission.

Another object of this invention is to provide a solar pumped laser that requires lower solar concentrations to achieve lasing thereby making the laser less susceptible to spatial variations in the input solar radiation pattern and the laser beam profile more stable, and also less pyrolysis of the lasant material.

A further object of this invention is to lengthen the lasing path of a solar pumped laser and concentrating the collected solar radiation such that its intensity pattern matches the lengthened lasing path.

Other objects and advantages of this invention will become more apparent hereinafter in the specification and drawing.

SUMMARY OF THE INVENTION

This invention is a solar pumped laser including a laser cavity containing the lasing medium, three dielectric mirrors internal to the laser medium, a mirror with maximum reflectivity external to the laser medium, and a mirror with finite transmission external to the laser medium. The three internal mirrors and two external mirrors are located such that the path of any lasing inside the laser cavity forms a square with the output laser beam being emitted through the external mirror with finite transmission. The square path provides the long gain length for the laser. The laser cavity has two glass windows opposite one another to allow for the input of solar radiation. Solar energy is collected and concentrated such that a cross-section of the intensity pattern has a donut shape. This radiation is directed into the laser cavity through each of the opposing glass windows. The solar intensity pattern closely overlaps the square lasing path within the laser cavity except at the corners of the cavity where the mirrors are located. Thus, the majority of the lasing path is exposed to concentrated solar radiation thereby reducing the solar concentrations necessary to produce stable lasing.

BRIEF DESCRIPTION OF THE DRAWING

The sole Figure is a schematic drawing of the invention.

DETAILED DESCRIPTION OF THE INVENTION

Turning now to the embodiment of the invention selected for illustration, the number 11 in the drawing designates a square frame for a laser cavity 12. Frame 11 can be made from any suitable material such as, for example, stainless steel. The front and back sides of frame 11 are covered by quartz glass plates 13 and 14 respectively. Suitable O-rings, not shown, are inserted between glass plates 13 and 14, and frame 11 to provide a vacuum seal. Brewster angle windows 15 and 16 are mounted over openings in the upper right-hand corner of frame 11. Three dielectric mirrors 17, 18, and 19 are attached to three internal corners of frame 11 and are aligned with Brewster angle windows 15 and 16 such that a light beam passing inwardly through window 15 will be reflected by mirror 17, mirror 18, and mirror 19 through window 16 and a light beam passing inwardly through window 16 will be reflected by mirror 19, mirror 18 and mirror 17 through window 15. A back cavity mirror 20 having maximum reflectivity (approximately 100%) at 1.3 $\mu$m, for example, is located outside cavity 12 adjacent window 15 such that a light beam passing outwardly through window 15 will be reflected back through window 15. An output laser cavity mirror 21 having a reflectivity of approximately 85% is located outside cavity 12 adjacent window 16 such that a light beam passing outwardly through window 16 will be partially reflected back through window 16. A laser gas, for example $C_3F_7I$, is pumped into cavity 12 through a pipe 22 and is expelled through a pipe 23 to radiators (not shown) to be cooled.

Whenever there is sufficient solar radiation passing through windows 13 and 14 to cause the laser gas inside cavity 12 to lase, the lasing will take place between mirrors 20 and 21 along a square path 24. Inasmuch as mirror 21 is only 85% reflective there will be some beam transmission 25 through the mirror 21 which is the output of the laser.

The apparatus for collecting solar radiation and applying the radiation to the box laser includes two large reflectors 30 and 30a having central holes 31 and 31a. These two large reflectors are supported by a platform 32 and struts 33 and 33a. The solar radiations striking reflectors 30 and 30a are reflected onto mirrors 34 and 34a which reflect the collected radiation through holes 31 and 31a, respectively. Since reflectors 30 and 30a have central holes the solar intensity patterns 35 and 35a of the solar radiation reflected through holes 31 and 31a are "donut" shaped. That is, a cross section of the solar intensity patterns is the area between two concentric circles. The solar intensity patterns 35 and 35a are reflected by mirrors 36 and 36a onto windows 13 and 14, respectively. The solar intensity patterns are adjusted so that they fit the laser ls cavity path 24 as nearly as possible. The size of the solar intensity patterns can be adjusted by adjusting the divergence of the patterns at mirrors 34 or 34a or by adjusting the angles of mirrors 36 and 36a. Inasmuch as the solar intensity patterns are fitted to square path 24, most of the solar radiation is concentrated throughout the lasing path except in the corners where the mirrors are located. Hence, there will be no excessive overheating of the internal mirrors.

Alternate forms of the invention include appropriate gases other than $C_3F_7I$ as the lasant medium. The internal dielectric mirrors could be arranged differently depending upon the input solar radiation intensity pattern to allow efficient coupling to the input solar pattern. Also, any number n of mirrors could be arranged to form a symetrical loop path having n+1 sides. However, when n is greater than three there could be more heating of the mirrors thereby requiring active cooling. In addition, the external laser cavity mirrors could also be mounted internally, thereby reducing optical loss from the Brewster angle windows.

The advantages of the present invention are numerous. It will find great utility in space power transmission where long transmission distances are encountered. The size of the laser cavity provides the necessary area to develop a long gain length laser. The concentrating and matching of solar input pattern to lasing path provides a solar pumped box laser requiring relatively low input solar concentration thereby making the system less susceptible to variations in solar input resulting in a more stable laser beam profile.

What is claimed is:

1. A method for improving the efficiency of a solar pumped laser comprising the steps of:
   increasing the length of the lasing path of said laser by forming a loop in the lasing path;
   collecting solar radiation;
   concentrating the collected solar radiation into a donut shaped solar intensity pattern; and
   directing the concentrated solar radiation into said lasing path loop such that a maximum amount of the solar radiation is applied directly to said lasing path.

2. A method according to claim 1 wherein the concentrated solar radiation is applied to the lasing path loop in two directions.

3. A method according to claim 1 wherein said loop is a square.

4. A method for pumping a laser comprising the steps of:
   lengthening the path of the lasing within the lasing medium of said laser by making the path in the form of a closed loop;
   collecting solar energy;
   shaping the solar intensity pattern of the collected solar energy to approximately the form of said path; and
   directing the shaped solar energy into said path such that a maximum amount of the solar energy is applied to said path.

5. A method according to claim 4 wherein said closed loop is a square.

6. A solar pumped laser with increased efficiency comprising:
   means for providing a lasing path with a loop in the path;
   means for collecting solar radiation;
   means for concentrating the collected solar radiation into donut shaped intensity pattern; and
   means for directing the concentrated solar radiation pattern into said lasing path such that there is a fit between said loop and said donut shaped intensity pattern.

7. A solar pumped laser according to claim 6 wherein said means for providing a lasing path with a loop includes mirror means for forming said loop.

8. A solar pumped laser according to claim 7 wherein said loop is a square and said mirror means consists of three mirrors with each mirror located at a corner of said square.

9. A long gain length solar pumped laser comprising:
   an enclosure with first, second, and third windows and containing a lasing medium;
   a first mirror with maximum reflectivity located outside said enclosure adjacent said first window;
   a second mirror with finite transmission located outside said enclosure adjacent said second window;
   mirror means located inside said enclosure for directing any lasing inside said enclosure back and forth between said first and second mirrors and for lengthening the path of the lasing; and
   means for collecting solar energy and directing the collected solar energy through said third window into said lasing medium to cause it to lase whereby the output of the laser is the transmission through said second mirror.

10. A long gain length solar pumped laser according to claim 9 wherein said mirror means is located such that the path of any lasing inside said enclosure forms a closed loop.

11. A long gain length solar pumped laser according to claim 10 wherein said closed loop is a square.

12. A long gain length solar pumped laser according to claim 11 wherein said mirror means is three mirrors with each located at a corner of said square and with the fourth corner of said square formed by the intersection of the reflections from said first and second mirrors.

13. A long gain length solar pumped laser according the claim 10 including a fourth window in said enclosure and wherein said means for collecting solar energy and directing it through said third window includes means for directing the collected solar energy through said fourth window into said lasing medium.

14. A long gain length solar pumped laser according to claim 10 wherein the solar intensity pattern of said solar energy directed through said third window closely matches said path of said closed loop except where said closed loop contacts said mirror means.

15. A long gain length solar pumped laser according to claim 14 wherein said solar energy is directed through said third window with a solar intensity pattern in the shape of the area between two concentric circles and said closed loop is in the shape of the area between two concentric squares.

16. A long gain length solar pumped laser according to claim 15 including a fourth window in said enclosure opposite said third window wherein said means for collecting solar energy and directing it through said third window includes means for directing the collected energy through said fourth window into said lasing medium.

* * * * *